United States Patent [19]

McGinnis et al.

[11] 4,051,541
[45] Sept. 27, 1977

[54] ACCESS TO FLOPPY DISK STACK

[75] Inventors: Bernard William McGinnis; James Amos Weidenhammer, both of Poughkeepsie, N.Y.

[73] Assignee: International Business Machines Corporation, Armonk, N.Y.

[21] Appl. No.: 638,792

[22] Filed: Dec. 8, 1975

[51] Int. Cl.² .......................... G11B 5/60; G11B 5/82; G11B 25/04
[52] U.S. Cl. ......................................... 360/98; 360/99
[58] Field of Search ..................... 360/98, 99, 86, 137, 360/105, 135; 206/444; 346/137

[56] References Cited

U.S. PATENT DOCUMENTS

| | | | |
|---|---|---|---|
| 3,090,626 | 5/1963 | Wadey | 360/135 |
| 3,130,393 | 4/1964 | Gutterman | 360/105 |
| 3,618,055 | 11/1971 | Van Acker et al. | 360/98 |
| 3,835,998 | 9/1974 | Cobb et al. | 360/99 |
| 3,936,878 | 2/1976 | Chrysler | 360/98 |
| 3,936,880 | 2/1976 | McGinnis et al. | 360/99 |

*Primary Examiner*—Alfred H. Eddleman
*Attorney, Agent, or Firm*—Robert Lieber

[57] ABSTRACT

A method and associated apparatus for efficiently establishing a "self-sustaining" split in a rotating stack of floppy type storage disks in a form suitable for read/write transducing access. The formation of such splits is fully described in U.S. Pat. No. 3,936,800 to McGinnis et al. In the present method a partial split formed at one disk interface position is used as a stable reference for detecting the location of that interface position relative to a target address position. The form of the partial split is not suitable for storage transducing access. However, the partial split forms much more quickly than the self-sustaining split. If the deviation from the target position is zero the partial split is transformed directly into the self-sustaining fully accessible form by controlling internal ventilation pressure between the disks in accordance with said patent 3,936,880. If the deviation is not zero the mechanism forming the partial split (e.g., external air jet) is repositioned in small corrective increments thereby shifting the partial split and eventually reducing the deviation to zero (the deviation being redetermined after each increment of repositioning). Since the time required to form the partial split is much less than the time required to form a fully accessible split it follows that the average access delay, with such "trial-and-error" positioning and iterative determination of deviation, is significantly less than the time required otherwise for correctable positioning of a self-sustaining split.

16 Claims, 14 Drawing Figures

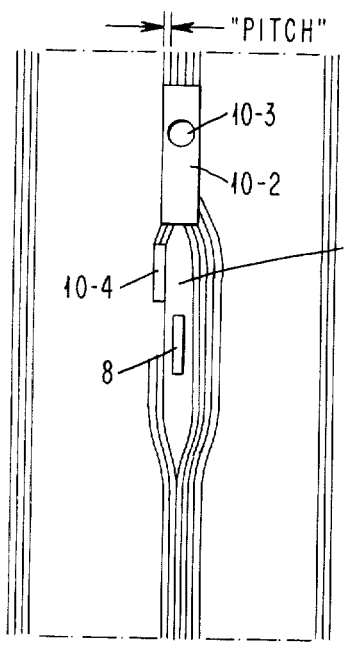
FIG.3
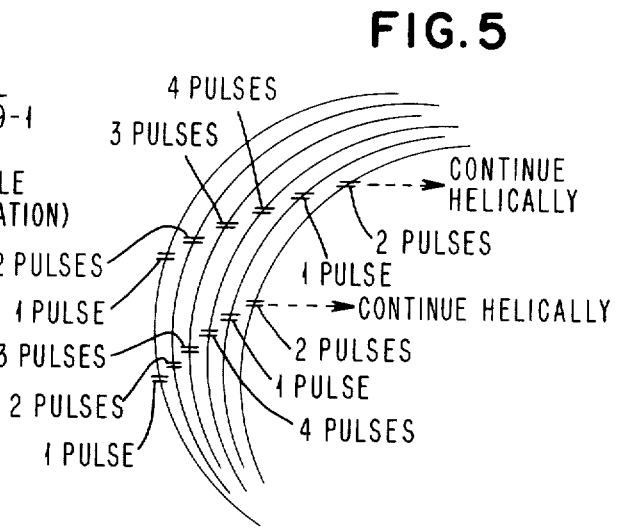
FIG.5
FIG.6
SENSE HEAD OUTPUT FOR PARTIAL SPLIT
A ("RT-ALIGNED" ON A "1-PULSE" DISK)
← SPLIT GAP →
B ("RT-ALIGNED" ON A "2-PULSE" DISK)
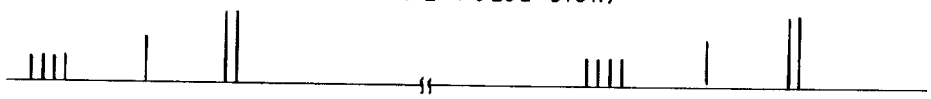
C ("RT-ALIGNED" ON A "3-PULSE" DISK)
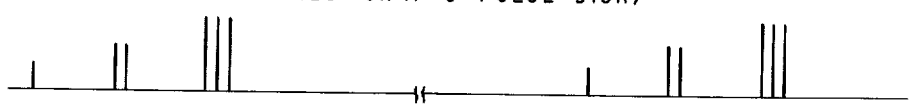
D ("RT-ALIGNED" ON A "4-PULSE" DISK)

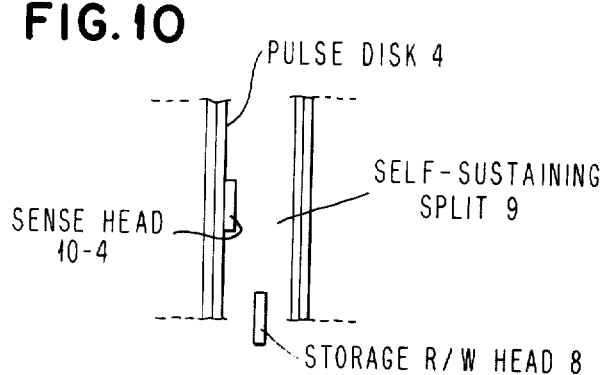
FIG. 10
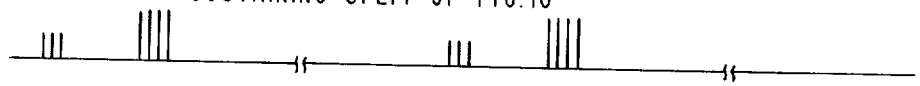
FIG. 11 SENSE-HEAD VERIFICATION OUTPUT FOR SELF-SUSTAINING SPLIT OF FIG.10
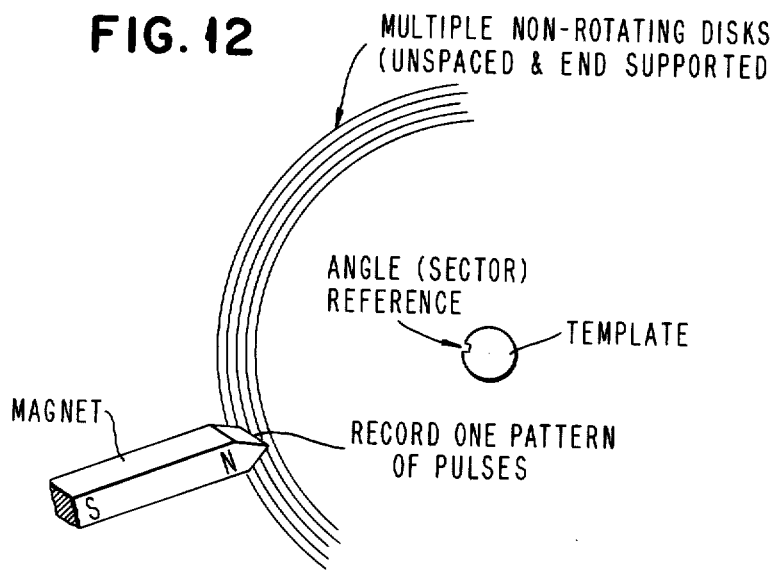
FIG. 12
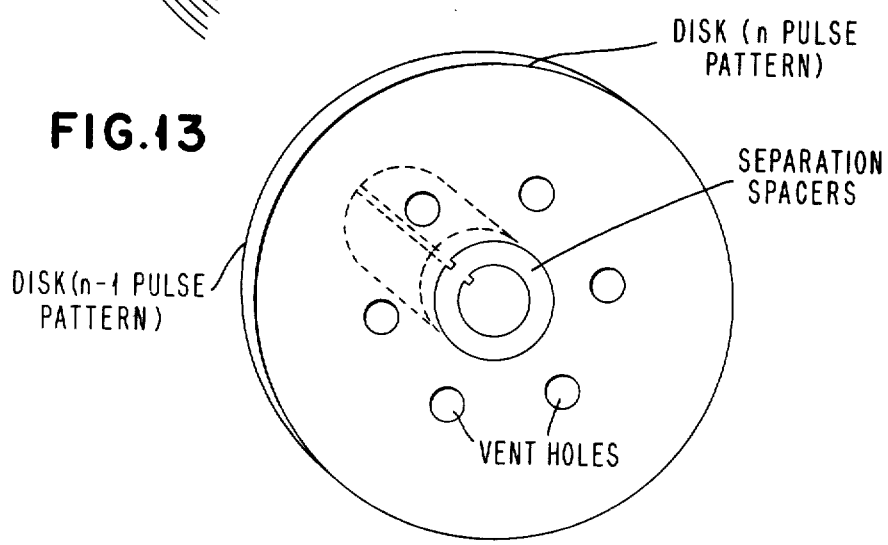
FIG. 13

ACCESS TO FLOPPY DISK STACK

CROSS REFERENCES TO RELATED PATENT APPLICATIONS

1. U.S. Patent Application, Ser. No. 414,614, by R. J. Penfold et al, filed Nov. 7, 1973, entitled "Multiple Flexible Disk File", now U.S. Pat. No. 3,867,723, issued Feb. 18, 1975, assigned to the assignee of this application.

2. U.S. Pat. No. 3,936,880 granted Feb. 3, 1976 to B. W. McGinnis et al, filed July 1, 1974, entitled "Bistable Deflection Separation of Flexible Disks", and assigned to the assignee of this application.

3. U.S. Patent Application, Ser. No. 375,986, by B. W. McGinnis et al, filed July 2, 1973, entitled "Selectively Tensioned Transducer Assembly For Operation in Compliant Relation to Individual Memory Discs of A Partitionable Aggregate Of Rotating Flexible Discs", now U.S. Pat. No. 3,810,243, issued May 7, 1974, assigned to the assignee of this application.

4. U.S. Patent Application, Ser. No. 428,601, by W. R. Chrysler, filed Dec. 26, 1973, entitled "Disc Interface Location", now U. S. Pat. No. 3,936,878, assigned to the assignee of this application.

5. U.S. Patent Application, Ser. No. 375,985, by R. O. Cobb et al, filed July 2, 1973, entitled "Edge Locating Apparatus", now U.S. Pat. No. 3,835,998, issued Sept. 17, 1974, assigned to the assignee of this application.

BACKGROUND OF THE INVENTION

1. Field of the Invention

This invention relates to a method and apparatus for precisely locating a separation split of uniform profile in a rotating stack of flexible storage disks; said split permitting uniform transducing access to otherwise inaccessible disk storage surfaces.

2. Description of the Prior Art

Matter disclosed in related U.S. patents 3,867,723 (Penfold et al) and 3,936,880 (McGinnis et al) cross-referenced above is incorporated herein by following references thereto.

Ventilation of spaced flexible disk surfaces in a multi-disk file — to stabilize rotation and prevent adhesion between interfacing surfaces — is known in the art. Ventilation flow may be supplied through radially porous spacers (refer to Penfold et al U.S. Pat. No. 3,867,723 cross-reference No. 1 above) or through aligned off-axis holes in the disks (U.S. Pat. No. 3,509,553 granted April 28, 1970 to Krijnen).

U.S. Pat. 3,936,880 by McGinnis et al (cross-reference No. 2 above) teaches that at certain ventilation pressures the stack can be disturbed from an unsplit configuration into a stable split configuration in which a variably positioned split suitable for random transducing access is sustained autonomously (without i.e. external force). Characteristically this access split also referred to herein as auto-sustaining split and self-sustaining split) has a circumferentially uniform profile which desirably provides uniform transducing access at all radial coordinates (tracks) within a useful radial range.

An important factor in respect to effectively utilizing this technique of forming auto-sustaining splits is to be able to establish the position of the split precisely and quickly at a designated (target) axial position (coordinate) in the stack. The transitional delay in forming such a split is not negligible. Hence any inexactitude in the process employed to establish the position of said split represents a probable cause of error and retrial (requiring erasure of the split and formation of another split at another position). Undesirably this increases the average access delay (seek time) presented to the system user. If the inexactitude cannot be controlled within bounds (i.e. if the probability of error in retrial cannot be made significantly less than the probability of error in the initial access attempt) the increase in the average access delay time is compounded.

A problem in this regard is that for volumetric storage packing efficiency it is desirable to use ultra-thin large diameter disks (e.g. 0.001 inch thickness; 12 inch diameter) which, in the unsplit mode, rotate at closely spaced intervals (e.g. 0.0035 inch). With such parameters slight but unavoidable irregularities in the disk orbits, due to natural centrifugal wobble and run-out (variations in circumferential thickness) tend to significantly degrade the preciseness of interface location.

Even if elaborate and/or fairly expensive (or bulky) sensing apparatus is employed to sense the position of a target interface in the unsplit stack (refer to cross-references 4 and 5 above) the possibility of erroneous positioning of the auto-sustaining split cannot be completely eliminated.

SUMMARY OF THE INVENTION

An object of the present invention is to provide a method and system for positioning an auto-sustaining split in a variably ventilated flexible disk stack which is quicker and more precise than the other known techniques.

Another object is to provide a method and apparatus, for precisely positioning a said auto-sustaining split, characterized in that the average probability of error in the positioning of said split is extremely small compared to the error probability associated with any other known system or method.

Another object is to provide a system and method as stated above, with reduced probability of positioning error, characterized further by relative simplicity and inexpensiveness.

A feature of the invention is that an externally sustained partial split, having an irregular form less suitable for storage transducing access than said auto-sustaining split, is formed comparatively quickly (by comparison to the time for forming an auto-sustaining split) at one shiftable "trial" position in the stack. This position is coarsely estimated to coincide with the desired target address. The partial split is sensed externally as a relatively unvarying and distinctive reference, and such sensing is used to determine whether the trial position coincides with or differs from the target address.

Another feature of the invention is that it permits the use of an approximate algorithm or table for designating initial trial positions. Because of this feature, duplicate stacks need not be precisely characterized on an individual basis as a result of tolerance buildup or other minor variations.

A related feature is that progressively differentiatable indicia on the disk edges, picked up by a sensing head positioned adjacent a wide portion of said partial split, provide a precise indication of the deviation of the partial split from the target address.

An associated feature is that said indicia indicate the relative direction as well as the magnitude of said deviation.

An associated feature is that said deviation indication is used alternatively to control the immediate formation of a said auto-sustaining split (if the deviation has null magnitude) and incremental repositioning of the partial split in the correct direction for nullifying a non-null deviation with redetermination of said deviation, etc. The incremental repositioning of the partial split can be controlled by the apparatus and method presently described so as to invariably avoid overshooting the target address and the initial trial location of the partial split can be established to a predetermined accuracy; e.g. to within one interface space on either side of the correct target coordinate. Consequently the access delay with incremental correction can be held to a minimum.

An associated feature is that the auto-sustaining split is formed without first erasing the partial split (i.e. without removing the external influence sustaining the latter) and only then is the external influence for the partial split (e.g. pulsed air jet) terminated; thereby avoiding interim edge fluctuations which could cause error.

The auto-sustaining split is formed by reducing the ventilation pressure to a bistable equilibrium range in accordance with teachings of said McGinnis et al U.S. Pat. No. 3,936,880 (cross-reference No. 2 above).

Such reduction in ventilation pressure generates sub-pressures between the disks relative to pressure in the partially split space. In turn this "divergently" displaces rotational orbits of unrestrained surfaces of the disks relative to the partial split. As disclosed by McGinnis et al in their cross-referenced U.S. Pat. No. 3,936,880 when such sub-pressures are held in a particular (empirically determinable) range relative to disks confirmed between inflexible and plates (said disks having given thickness, diameter, spacing and rotation velocity) this displacement stabilizes "autonomously" into a sustained circumferentially uniform configuration suitable for high density transducing access.

The present invention accomplishes precise, reliable and timely location of the auto-sustained split simply and inexpensively. The time required to form a partial split and sample its deviation (variance) from a target address position is considerably less than the time required to form an auto-sustained split. Thus, the present invention seeks, by controlled trial positioning of the partial split and variance monitoring, to precisely yet quickly locate the partial split at the target position before forming the auto-sustaining split. If the variance is not zero the position of the external disturbance (jet) sustaining the partial split is advanced incrementally in the correct direction for nullifying the variance and at small enough increments (one-half of an interface space) to avoid overshooting the target. The variance is rechecked after each increment until a null is detected (i.e. coincidence of partial split and target address). Upon detection of null variance the ventilation pressure is reduced to establish the auto-sustained accessible split at the latest position of the partial split. The force for sustaining the partial split is then terminated and the storage read/write head is maneuvered radially into the auto-sustained split.

The variance is determined simply and relatively inexpensively by providing progressively differentiable indicia on successive disk edges. An inexpensive pickup head coupled to plural disks, picks up plural indicia distinguished by a gap due to the partial split as a precise and unvarying indication of the position of the partial split in the stack. An air nozzle alignable with one inter-disk space, and carried in fixed relation to the sensing head, is operated transiently to direct a sharply focused jet of air into one space and thereby form the partial split. The indicia sensing head is located at a wide part of the split and thereby "sees" a gap in the progression of sensed indicia. This gap and the precedent indicia element correspond uniquely to the position of the split and are used to determine the displacement (variance) of the partial split relative to the target position.

Conveniently, the indicia on successive disks are formed as magnetically (or optically) sensible pulse bursts which are angularly offset (and thereby time-staggered) on successive disks. The number of pulses in successive bursts differs by one (modulo $k$) in a progression repeating every $k$ disks. The repetition group size $k$ is dependent upon the initial trial positioning accuracy. For a trial accuracy of $\pm t$ spaces $k$ should be at least $2t + 1$.

A less convenient and generally more expensive alternative is to employ unstaggered ("time-overlapped") but otherwise progressively distinguishable indicia (e.g. uniquely filterable or correlatable waveforms).

The foregoing and other objectives, aspect, features and advantages of the invention may be more fully appreciated by considering the following description.

BRIEF DESCRIPTION OF THE DRAWINGS

FIG. 3 shows the arrangement of FIG. 2 in front elevation with a partial split formed by the air nozzle;

FIG. 5 shows disks having helically configured progressively differentiatable indicia for locating a split within a group of $k = 4$ disks;

FIG. 6 shows signal patterns derived from the indicia of FIG. 5 for various positions of partial split formation;

FIG. 10 shows the head for sensing position in relation to a self-sustaining split;

FIG. 11 shows the verification pattern for the self-sustaining split; and

FIGS. 12 and 13 show a method of arranging indicia on disks and of arranging the disks in a stack.

DETAILED DESCRIPTION

INTRODUCTION

Figure 1:
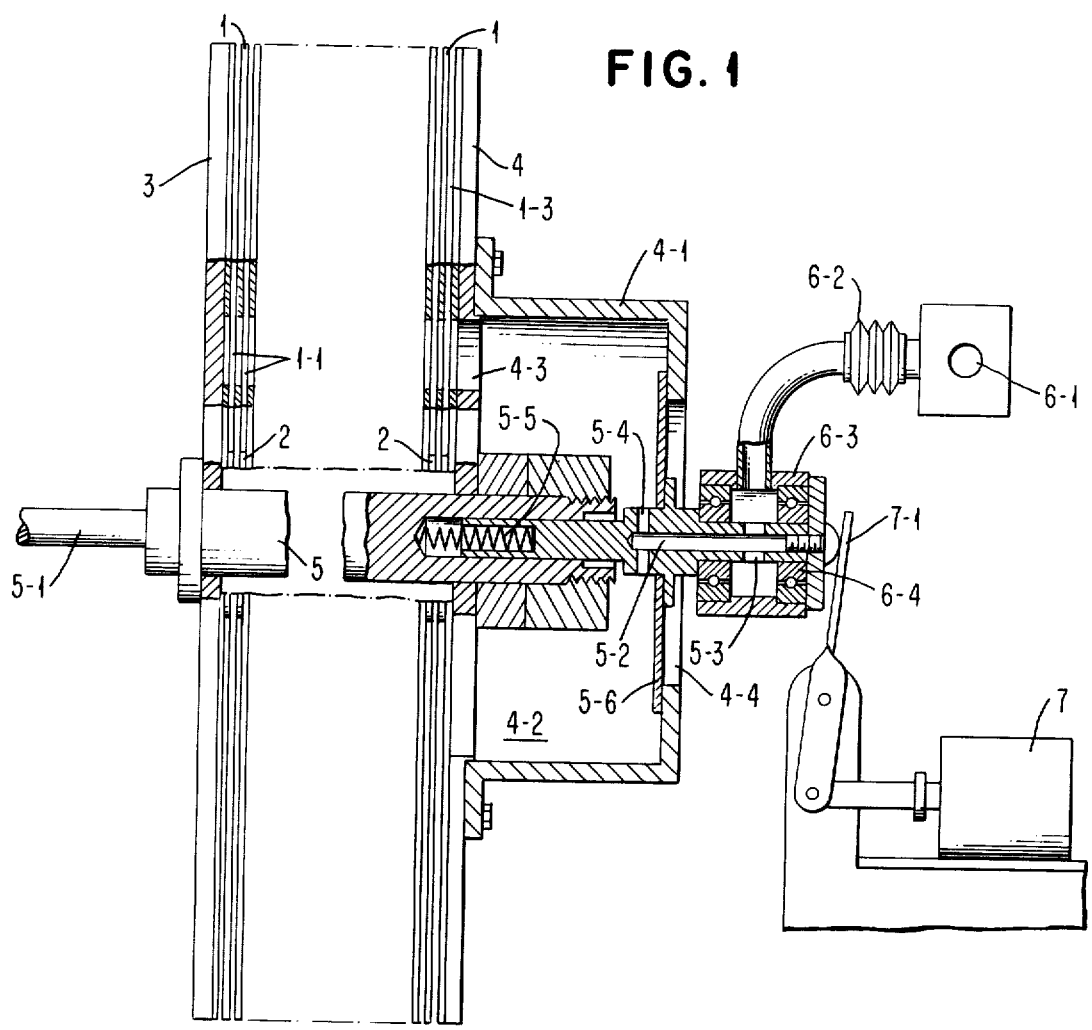
FIG. 1 shows a ventilated disk stack with variable ventilation pressure as an exemplary environment for the present invention.

An environment for explaining the present invention FIG. 1 shows multiple stacked flexible disks 1, ventilated for auto-sustainable splitting in accordance with U.S. Pat. No. 3,936,880 by McGinnis et al, cross-reference No. 2 above; the disclosure of said application being incorporated herein by this reference. A brief description of this system follows.

Storage disks 1, separated centrally by thin spacer elements 2, are confined in an ordered stack between inflexible end plates 3, 4 (FIG. 1). This stack assembly is supported on spindle 5 and driven in continuous rotation at high speed (e.g. at 1800 rpm) via shaft 5-1 and a not-shown motor.

Ventilation cut-outs 1—1 (FIG. 1) in the disks 1 are aligned to form continuous air circulation channels parallel to the axis of disk rotation connecting with the spaces between the disks (from the edges of spacers 2 to the outer edges of the disks). Cap 4-1 on plate 4 forms an enclosed space 4-2 (FIG. 1) connecting, via holes 4-3 in end plate 4, with aligned holes 1-1 in the disks.

Air expelled from between the rapidly rotating disks by centrifugal action is replenished either partially or completely, by air variably supplied to space 4-2. This supply affects the deflection equilibrium of the disk storage surfaces 1-3 (contained between holes 1-1 and the peripheries of respective disks) as disclosed in said McGinnis et al patent 3,936,880.

The pressure of air supplied to space 4-2 is determined as follows. Tube 5-2 (FIG. 1) rotatably linked to rotational support 5, forms a supply duct for "sub-pressurization" of space 4-2. Manually adjusted constricted opening 6-1 connects with the interior of tube 5-2 via non-rotating flexible tube 6-2; the latter joined to stationary sleeve 6-3 in which tube 5-2 is rotatably journaled by bearings 6-4.

The interior of tube 5-2 connects with the interior of tube 6-2 via openings 5-3 and with space 4-2 via openings 5-4. Thus air opening 6-1 is connected to the spaces between storage surfaces of disks 1 via: tube 6-2, tube 5-2, openings 5-4, space 4-2, end plate holes 4-3 and holes 1-1 in the disks.

Opening 6-1 is manually adjusted so that air transferred to the inter-disk spaces from only this opening is at a sub-pressure, in a predetermined range below atmospheric, which conditions the rotation of the disks to bistable deflection equilibrium in accordance with teachings of the above-referenced McGinnis et al U.S. Pat. No. 3,936,880.

Tube 5-2 and sleeve 6-3 can be shifted laterally to the left in FIG. 1, against the restraining action of spring 5-5, by operating solenoid 7 to rotate armature 7-1 counterclockwise shifting plate 5-6 inwardly away from cap 4-1. This connects space 4-2 directly to atmosphere through large hole 4-4 in cap 4-1 and thereby increases the pressure in space 4-2 above the previously mentioned bistable deflection range, whereby the deflection equilibrium of the disks becomes monostable. When the solenoid is operated reversely spring 5-5 restores plate 5-6 to sealing relationship relative to hole 4-4.

In monostable deflection equilibrium the free surfaces 1-3 of the disks "resist" splitting deflection relative to paths determined by spacers 2. In bistable equilibrium the disks can be transiently disturbed from their equally spaced rotational configuration into the "wide" split configuration 9 shown in FIG. 4 extending over the full 360° rotational ambit and sustain the latter configuration after termination of the transient disturbance.

Figure 2:
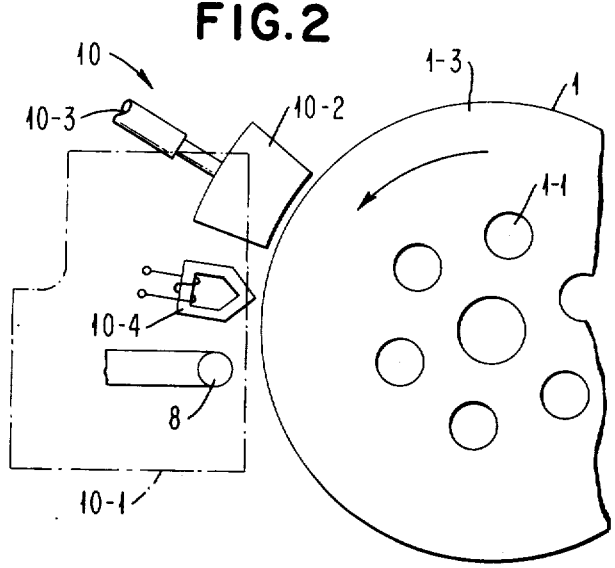
FIG. 2 is a side elevation of apparatus in accordance with the present invention for effectuating partial split and indicia sensing relative to the disks of FIG. 1.
Figure 4:
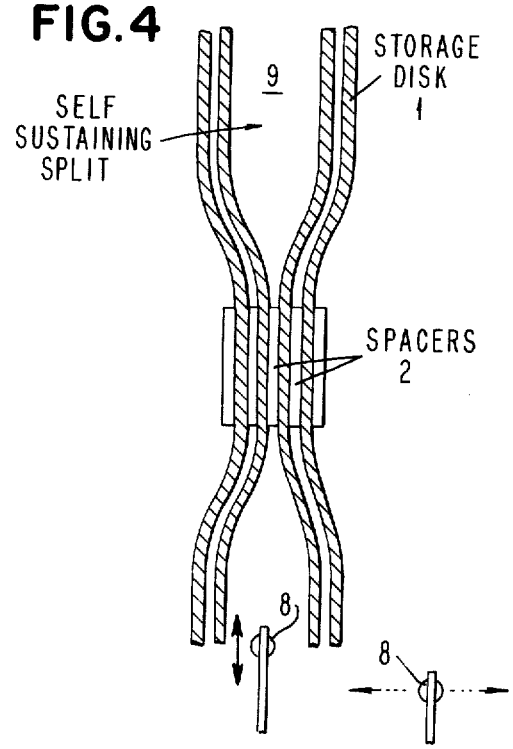
FIG. 4 shows a self-sustaining (full) split.

In the unsplit (equal spaced) configuration the disk storage surfaces 1-3 (FIG. 2) are inaccessible to externally transportable storage read/write head 8 (FIGS. 2-4). However, the self-sustaining split 9 (FIG. 4) easily accommodates the head 8 for storage transducing operations relative to any radial coordinate within a surface area 1-3 facing the split.

The present invention is concerned with apparatus and method for quickly, simply and precisely determining the location to be split before actually forming the auto-sustaining split. The ventilation configuration shown in FIG. 1 is one of two configurations disclosed in the above-referenced U.S. Pat. No. 3,936,880 by McGinnis et al. The other bistable ventilation configuration disclosed in said patent — by which the spaces between the storage surfaces receive ventilation through radial channels in the spacers 2, in accordance with U.S. pat. No. 3,867,723 by Penfold et al referenced above, and through a central space encompassed by the disks and said spacers — is also suitable for use presently as will be understood by those skilled in the art upon consideration of the ongoing description below.

Split Location and Effectuation

Apparatus 10 for quickly determining the location to be split in self-sustaining form 9 (FIG. 4) and for effectuating said self-sustaining split is shown in FIGS. 2, 3 and 5-11. Said apparatus includes (FIGS. 2, 3) a carriage 10-1 translatable parallel to the axis of rotation of the disks 1, a storage transducing head 8, an air nozzle 10-2 (connected through pipe 10-3 to a not-shown source of pressured air controlled by a not-shown electrically operated valve) and a position sensing head 10-4 for sensing indicia permanently recorded on the edges of disks 1 in progressively varied configurations.

The nozzle 10-2 (which has been described in IBM Technical Disclosure Bulletin, Vol. 17, No. 1, pages 329 and 330, June 1974, "Rifling Device" by B. W. McGinnis and IBM Technical Disclosure Bulletin, Vol. 17, No. 11 pages 3351 and 3352, April 1975, "Air Nozzle For Floppy Disk Selection" E. D. Barkhuff, D. S. Borm and B. W. McGinnis) and indicia sensing head 10-4 are carried on carriage 10-1 in fixed positions relative to each other and the carriage. Head 8 is preferably (but not necessarily) supported on carriage 10-1 and mounted for radial movement into and out of said split 9. Alternatively head 8 may be mounted for axial movement independent of carriage 10-1.

If the ventilation pressure is elevated by uncovering hole 4-4 (producing monostable deflection equilibrium at surfaces 1-3), and air is supplied to nozzle 10-2, a partial split 9-1 (FIG. 3) forms in the disk interspace most nearly aligned with the nozzle opening. This partial split extends over a small angular sector of the 360° rotational ambit of the disks and is not sufficiently regular in form to allow for unobstructed radial insertion of the storage read/write head 8 and uniform tracking by said head.

If hole 4—4 is re-covered (thereby reducing ventilation pressure to bistable level), while a partial split is being sustained at an interface by air emitted from nozzle 10-2, the disks at the partially split interface displace into the self-sustaining fully-accessible split configuration, such as 9 in FIG. 4, which properly accommodates the head 8.

The partial split forms in considerably less time than the full split (0.010 seconds compared to from 0.1 to 0.5 seconds) and is used to provide precise positional verification before the slower action of forming the self-sustaining split is undertaken.

As additional background explanation it is observed at this point that the disks 1 in FIG. 1 are generally utilized as follows. For each new access ("seek") the storage system utilizing the subject disks specifies a target address (cylindrical coordinates within the volume of revolution of the stack) just as in any conventional multiple disk file system. The present invention operates to form a partial split right-aligned with head 10-4 (FIG. 3) at a coarse trial position very close to (within 1 spacer pitch of) the axial coordinate of the target address and to determine unambiguously whether the position of the partial split coincides with the target coordinates. If coincidence is not detected (non-null variance) the carriage is repositioned incrementally in the direction for nullifying the variance and the variance is re-sampled. When coincidence is eventually detected (within two reposition increments) the ventilation pressure is reduced (by operation of solenoid 7 releasing plate 5-6 to re-cover hole 4—4) generating the self-sustaining split at the last partially split interface (i.e. precisely at the target axial coordinate). The air supply to nozzle 10-2 is then turned off and head 8 is positioned to the radial (track) coordinate of the target address.

In accordance with the present invention determination of variance is facilitated by progressively differentiated indicia pre-recorded (permanently) on the edges of successive disks. These indicia are picked up by head 10-4. When a partial split (FIG. 3) is formed the picked-up signals form a pattern uniquely associatable (modulo 4) with the coordinate position of the partial split. This pattern is thereby useful for precisely determining the displacement of the partial split relative to the pre-specified target address.

At this point some discussion is in order to explain the problem of precise location solved by the present invention. Parameters of interest for an exemplary stack are:

Rotation Velocity: 1800 rpm
Disk Diameter: 12 inches
Disk Thickness: 0.0011 inch (nominal)
Spacer Thickness: 0.0035 inch
Auto-sustaining Split
   Width: 0.160 inch (approximate)
   Time to form (from time of equlibrium disturbance to stabilized split): From 0.5 to 0.1 second (depending on type of acceleration expedient employed, e.g. vacuum-assist)

In general the above disk thickness may vary slightly from disk to disk and circumferentially on each disk. Due to this and other slight irregularities (e.g. in ventilation) the disk edges wobble slightly while rotating. In the unsplit configuration the displacements of the disks due to such wobble may be large in relation to the nominal spacing between disks (0.0035 inch).

Thus, the location of the peripheral edges of any interface in the unsplit stack may vary considerably over a cycle of revolution giving rise to possible error in the placement of a split-inducing disturbance.

The timing information above indicates that if an auto-sustaining split is formed at an incorrect "trial" coordinate the consequent additional access delay — for detection of error, erasure of the split and reformation of the split at a "next" coordinate — could be considerably in excess of 0.5 seconds; which represents a non-negligible additional delay. Even then the preciseness of location of the reformed split could be uncertain due to wobble after the erasure.

Consequently, it will be understood that it is desirable to be able to precisely verify the location of the auto-sustained split prior to its actual formation. The present invention accomplishes this relatively quickly. The technique employed is to form a "quick" partial split (9-1, FIG. 3) at a trial location in the monostably ventilated stack very close to the target position (time required to form: 0.010 second), verify its location (time required: 0.010 second) and if correct induce the auto-sustaining split 9 of FIG. 4 (by decreasing the ventilation pressure to bistable equilibrium level). The circumferentially irregular form of the partial split (0.100 inch at widest point) is much less suitable for high density storage than the form of the auto-sustained split (less suited because of variations in track paths at different radial coordinates, variations in shape not shown in FIG. 3 presenting possible interference to proper insertion of head 8, etc). However, the form and timing of the partial split are highly suitable for precise and quick verification of the coordinate position of the split since the location of such split tends to be highly stable so long as the nozzle 10-2 is stationary and its air supply does not fluctuate drastically (typically the air pressure transferred to the nozzle 10-2 for quick forming and sustaining a partial split is held in the range 1-2 psi).

Upon verification the auto-sustaining split is formed without erasing the partial split (by releasing armature 7-1, thereby decreasing ventilation pressure to space 4-2) and the air supply to nozzle 10-2 is then cut off. If the verification process produces a variance indication (offset displacement of the partial split relative to the intended/target axial coordinate) the nozzle (and partial split) are incrementally repositioned in the direction for nullifying the offset and the verification procedure is repeated until a null is detected (after at most a few increments).

Verification in accordance with the present invention is facilitated by providing progressively differentiated indicia on the edges of successive disks. These are sensed in multiple and distinguished in sensing by a gap in the progression due to the presence of the partial split. The alternative of sensing the indicia on only a single disk facing the partial split is considered equally useful, but less simple and economical to implement.

A preferred form of distinguishable/differentiatable indicia which may be used presently is shown in FIG. 5. The disks contain magnetically inscribed pulse "bursts" offset at non-overlapping angle sectors on successive disks in a helical pattern. The bursts on successive disks have progressively different numbers of unit pulse variations. These variations may be repeated in groups of $k$ (e.g. four) disks as shown; the number $k$ depending upon the accuracy achievable in the initial trial location of the partial split relative to the target coordinate.

The number $k$ is also dependent upon the resolving ability of the indicia and sensing means. In the example shown, the number $k$ equals four, for simplicity of illustration. In practice, $k$ may be as much as 8 or 16 to accommodate the dispersion of the field emanating from magnetized indicia pulses on the edge of disks, and the broad range of response of a simple sensing head.

When an initial trial split accuracy of one interface unit (i.e. a positional accuracy of $\pm 0.0047$ inch for exemplary parameters given above) a grouping of $k = 4$ disks is adequate. In general for a trial accuracy of $\pm t$ spaces $k$ should be greater than $2t$. Thus, for a trial positioning accuracy of two space units a repetition grouping of at least five disks is used; for a trial positioning accuracy of three space units a grouping of at least seven disks, etc.

It may be convenient to bias the initial trial partial split to one side in such a fashion that the direction of successive incremental movements of the carriage toward the target coordinate is assured.

Referring to FIGS. 3 and 6 the progressively differentiated indicia of FIG. 5 are utilized as follows. Indicia sensing head 10-4 couples to two or more disks (because it would be very expensive to make a head exclusively coupling to a single disk but remaining free of contact with the edges of the disks) at a wide sector of the left edges of the partial split. The output of the head is one of the four distinctive patterns shown in lines A, B, C and D of FIG. 6 depending upon the location of the partial split 9-1.

If the split 9-1 is faced at the left by a disk containing a single pulse in its burst the pattern shown in part A of FIG. 6 would be picked up; i.e. a gap due to the split preceded by a one-pulse burst in turn preceded by a short space and a four-pulse burst, in turn preceded by a short space and a three-pulse burst (assuming the head is coupled to three consecutive disks). The basic assumption here is that the short spaces due to the staggering of bursts between successive disks is considerably less than either the gap due to the split or the time between repetitions of bursts on a single disk (assuming that the burst on each disk is repeated at intervals).

In the partial split 9-1 is faced on the left by a disk containing two pulses in each of its burst the pattern produced in part B of FIG. 6 would be obtained. If the split is faced by a disk containing three pulses in each burst the pattern of part C of FIG. 6 is picked up. Finally, if the split is faced by a disk containing four-pulse bursts the configuration shown in part D of FIG. 6 is obtained.

Now assume that the partial split can be positioned in any initial trial to an accuracy of within one space on either side of the target interface. If the initial trial is successful (precisely on target) the pulse pattern sensed by the sensing head will have a burst trailing the split gap corresponding identically to the burst anticipated for the disk facing the left side of the targeted coordinate. However if the initial trial is off target the burst trailing the gap will differ by no more than one pulse count (modulo 4) from the anticipated count.

Assume for instance that the targeted position is faced on the left by a four-pulse disk. Under the foregoing assumptions an unsuccessful initial trial placement of the partial split would give a sense pattern as in either part A or part C of FIG. 6 depending upon the direction of offset (variance). This error is then precisely correctable by procedure detailed later and it will be understood that this procedure precisely and rapidly locates the partial split at the targeted coordinate and then forms the auto-substaining split at that coordinate without first "un-forming" the partial split.

Now assume for the example just given that the accuracy of initial trial positioning is within two interface space units, rather than one interface space unit. This would mean that at the initial trial any of the patterns A through B (FIG. 6) could be picked up and the direction of the variance would be indefinite. If the pattern B is obtained and the targeted coordinate is associated with pattern B it would be impossible with the indicated repetition grouping of four disks to determine unambiguously whether the partial split is to the right or left of the targeted position since the same pattern B could be obtained in either case. Thus, for a trial positioning accuracy of two space units the indicia should repeat in groupings not smaller than five consecutive disks. For an accuracy of three units a repetition grouping of at least seven should be used, etc.

Consider next the reason for the use of head 10-4 coupled to plural disks. In the first place magnetically (or optically) inscribed indicia are inherently diffused and the position of head 10-4 relative to the edge of the disk immediately facing the partial split is not precisely determinable. Thus an exclusive coupling to a single disk would be very difficult to accomplish. And a head constructed to exclusively couple to a single (wobbling) disk and not neighboring disks would be very difficult to construct and expensive. Another factor is that even if a suitable magnetic head could be constructed the inscribed indicia might have to be in a location and form which could intolerably interfere with storage utilization of the respective disk. Accordingly a broad head and "weak" indicia are preferred.

Now, quite apparently with the head coupling to pulse indicia on two or more disks it is necessary to avoid having these indicia overlap, as otherwise they would be indistinguishable. Thus, the need for staggering on successive disks.

There is another desirable aspect in coupling to plural disks. Suppose for instance that each pattern in A through D of FIG. 6 consisted only of a single burst of one, two, three or four pulses, respectively; each followed by the distinctive long gap due to the split. Then the pattern of A could be mutated to the pattern of B by occurrence of a single erroneous noise pulse. Similarly the pattern B would be mutated to appear like the pattern C by sensing of an additional (noise) pulse, and so forth. However, the three-burst pattern of A could be distinguished from the three-burst pattern of B even if only a single burst had been mutated. Thus, the coupling to plural disks provides a basis for noise discrimination, and thereby a basis for enhanced verification precision.

Naturally it will be understood that instead of magnetically inscribed indicia and a magnetic head such as 10-4, FIG. 2, the indicated scheme would work identically for optically detectable indicia with an optical pickup head. Similarly, it will be understood that the indicia need not be angularly (time) staggered if they are in an otherwise differentiatable or distinguishable form. Thus, for instance the indicia could be arranged as waveforms having relatively distinctive frequency components such that with appropriate filtering their progression could be distinguished.

Figure 7A:
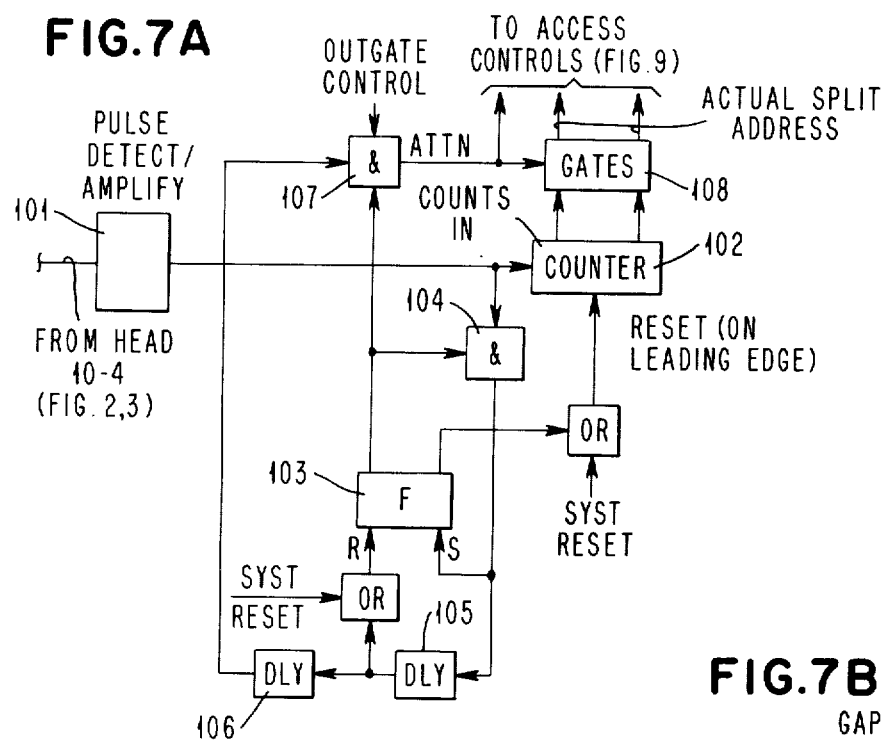
FIG. 7A shows circuits responsive to sensed indica for deriving a modulo 4 representation of the address of a partial split.
Figure 7B:
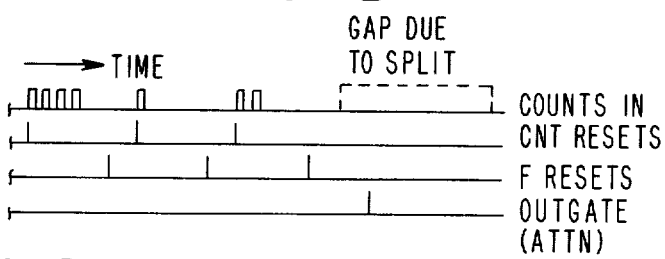
FIG. 7B shows signal waveforms developed in said circuits.
Figure 8:
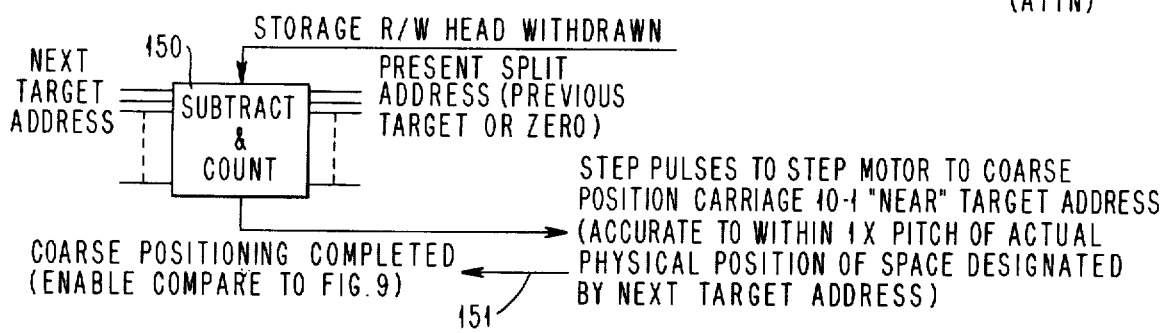
FIG. 8 shows logical controls, in general schematic form, for establishing a partial split in a coarse trial position.
Figure 9:
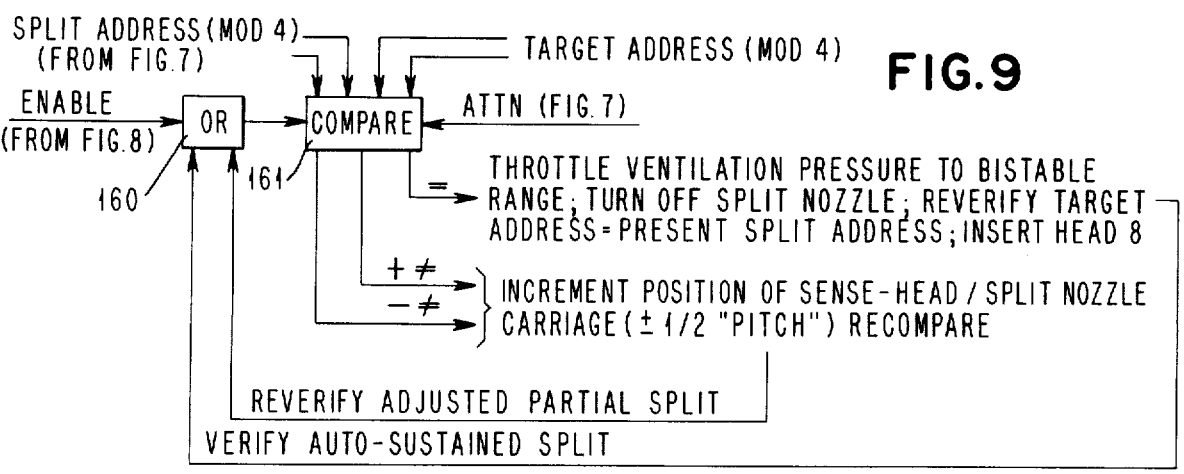
FIG. 9 shows logic for determining variance of a partial split and establishing a correctly positioned full (self-sustaining) split.

Returning to discussion of the variance detecting operation FIG. 7A shows logic for counting the pulses picked up by head 10-4 and FIGS. 8 and 9 schematically indicate the logic for utilizing the counts produced in FIG. 7 to verify split location. FIG. 7A shows that the pulses picked up by head 10-4 are detected and amplified at 101 and passed to the counting input (low order) stage of 2-stage counter 102. Counter 102 and flipflop 103 are initially reset (e.g. at system power on time) by a "system reset" pulse. Counter 102 is also reset at the start of each burst pickup by the leading edge of each setting transition of flipflop 103.

Flipflop 103 is set by the leading edge transition of the first pulse of each burst picked up by head 10-4; said first pulse being selected by AND circuit 104 which is enabled only when flipflop 103 is in the reset condition. Each such "first" pulse is also passed through a timing circuit having successive delay stages 105 and 106. The output of delay stage 105 resets flipflop 103. The output of delay stage 106 is selected by AND circuit 107, to outgate the content of counter 102 through gates 108, if and only if it occurs while flipflop 103 is in reset condition. This can occur only if a new burst is not received at the usual time following the preceding burst (i.e. only if the preceding burst is followed by a time gap due to a split).

This may be seen by referring to the timing diagram in part B of FIG. 7. The first line indicates a pulse burst arranged in the same pattern as line B of FIG. 6. The second line shows resetting of counter 102 at the leading edge transition of the first pulse of each count burst. The third line indicates resetting of flipflop 103 at a predetermined time after all pulses of the burst have been received but prior to detection of the next burst. Finally the fourth line indicates outgating of the count manifested by counter 102 and attention signaling to the access logic occur only relative to the last count developed prior to the time gap due to the split. This count, which corresponds uniquely (modulo 4) to the physical location of the split, is passed to the access controls of FIGS. 8 and 9 for verification processing relative to the target axial coordinate specified by the system.

The "outgate control" input to AND circuit 107 is provided as an overall system control. Primarily it is used to condition the preparation of circuit 107 after each trial or corrective (incremental) positioning of nozzle 102. Those skilled in the art will appreciate that this preparational control may also be utilized for more sophisticated purposes such as noise rejection. Although such usage forms no part of the present invention it is interesting to note its availability. If the system is operating correctly (noise-free) the counts developed for the three successive bursts preceding a time gap associated with a split will differ (modulo 4) by one unit. Thus, it would be possible to subtract the counts of successive bursts, to verify the absence of noise, and condition the outgate preparation of circuit 107 at least partially on the result. Alternatively of course the average noise level at the output of head 10-4 could be measured and utilized as a logical factor of outgate (and attention) signaling control.

Referring to FIGS. 8 and 9 the split position is determined as follows. At a signal from the system (e.g. upon completion of utilization of an existing split, and withdrawal of the storge read/write head from the existing split, or after seek signal is received following an initial power on) the present split address (full address, not modulo 4) is subtracted from the (next) target address (full address, not modulo 4) and a corresponding pulse train is issued by subtract and count circuit 150 FIG. 8. These pulses are appropriately amplified and delivered to a step motor which positions carriage 10-1 and nozzle 10-2 (FIG. 2) for the initial trial partial split. The air supply to nozzle 10-2 is turned on (either during the carriage traverse or at its completion) and the ventilation controls are set to the monostable position (plate 5-6, FIG. 1 displaced away from opening 4-4, FIG. 1) throughout the carriage traverse and subsequent verification procedure; thereby preventing formation of an auto-sustained split. When the carriage 10-1 arrives at the position for the trail split a completion signal on line 151 (FIG. 8) excites the enable input of OR circuit 160 (FIG. 9) and thereby enables operation of compare circuit 161 (FIG. 9). At the same time the outgate control of AND circuit 107 (FIG. 7) is prepared to permit transfer of the actual split address (modulo 4) from counter 102 through gates 108 (with concurrent attention signaling) to compare circuit 161.

If the actual split address (modulo 4) is equal to the target address (modulo 4) the ventilation pressure controls of FIG. 1 are operated to restore plate 5-6 to sealing relationship relative to opening 4—4 thereby reducing the pressure in space 4-2 to the range associated with bistable equilibrium operation. Since the disks are already separated at the target space by the continued presence of the partial split this action reduces the pressure in all disk interface spaces except the target space and displaces the disks at said space into the sustaining configuration 9 shown in FIG. 4. The air to nozzle 10-2 is then shut off and storage read/write head 8 is maneuvered radially into this new split for positioning relative to one of the facing disk surfaces.

If the partial split and new target do not coincide comparison circuit 161 indicates both the inequality and its sign (plus, minus) corresponding to the direction of misplacement (variance).

The sign of inequality is utilized to control a single increment of movement of carriage 10-1 in the direction for nullifying the inequality. A single increment of movement displaces nozzle 10-2 by approximately one-half of the stack "pitch" or less (a pitch interval, FIG. 3, is the central space occupied by a single disk/spacer pair of equivalently the nominal space in the unsplit configuration between corresponding free surfaces of successive disks).

During this corrective movement the air to nozzle 10-2 may be either pulsed off and then on or held continuously on. In either case the partial split either remains where it was previously or "moves over" by one coordinate position depending upon the relative location of the nozzle outlet and the nearest interface center line prior to the movement. If the partial split has not moved the verification controls of FIG. 9 again detect inequality and instigate another one-half pitch increment movement of the nozzle. If the partial split is displaced by one position the verification controls of FIG. 9 will detect equality (with the above-specified trial positioning accuracy) and cause transformation of the partial split into the full auto-sustaining split followed by blocking of the nozzle air supply.

Because of disk wobble or imperfections, a fluctuating output pattern of the target coordinate indicia may sometimes be encountered. In such a situation, as soon as the fluctuation occurs at the target coordinate pattern position, the auto-sustaining split is induced and if verification shows an error, the split is closed and another incremental step in the corrective direction is made.

It can be seen, therefore, that the above trial positioning, verification and (when required) corrective repositioning and reverification should conclude rapidly and controllably with successful location of the auto-sustaining split at the precise targeted coordinates of the new split address.

In practice, where $k$ is larger, the error may be a multiple number of spaces. It should be evident to one skilled in the art that the size of the error can be determined by suitable comparing means and used to select a multiple step spacing operation for a more rapid approach to the target location.

An additional verification option shown in FIG. 10 is to utilize the pickup head 10-4 and controls of FIGS. 7-9 to re-verify the correct location of the self-sustaining split after its formation but before insertion of read/write head 8.

FIG. 11 shows the output of head 10-4 relative to the disks facing the self-sustaining split in FIG. 10.

FIGS. 12 and 13 indicate a method for providing staggered burst indicia on the disks in the form indicated in FIG. 5. During fabrication (cutting) of the disks the disks may be held in multiple on a non-rotating fixture having a suitable common angle reference as shown in FIG. 12. A permanent magnet may be touched to the disk edges broadside at particular angle sectors to form identical burst patterns (e.g. "4 pulse" bursts) at predetermined angles relative to the reference. Aggregates of successive sets (multiples) of such disks would receive inscribed edge indicia of different form (one pulse burst, two pulse burst, three pulse burst, four pulse burst) at staggered positions relative to the reference and stacked on the spindle 5 of FIG. 1 in the appropriate alternating sequence (one disk from each set with intervening spacers 2). The angle reference utilized in FIG. 12 would be preserved on all of the disks to produce the requisite staggered relationship in FIG. 13 and thereby produce the time staggered bursts of FIG. 6.

While the invention has been particularly shown and described with reference to preferred embodiments thereof, it will be understood by those skilled in the art that various changes in form and detail may be made therein without departing from the spirit and scope of the invention.

What is claimed is:

1. In a mass storage flexible disk file containing multiple flexible storage disks rotating coaxially in a spaced stack configuration, said stack receiving ventilation fluid internally to replenish ambient fluid expelled from between said disks by centrifugal action, the pressure of said received fluid being variable to cause storage surfaces of said disks to rotate alternatively in distinct first and second states of axial displacement equilibrium, said states serving respectively to inhibit and support formation of a circumferentially uniform auto-sustaining split suitable for storage transducing access at any axial coordinate position in said stack when said stack is transiently disturbed at said position, the method of quickly and precisely aligning a source of said transient disturbance with a target coordinate position in said stack prior to formation of said circumferentially uniform split comprising:
    while said ventilation pressure is controlled to retain said surfaces in said first state of equilibrium, applying an external disturbance at a selected trial position in said stack estimated to coincide with said target coordinate but subject to imprecise determination due to varying motion of the eges of the disks interfacing at said target coordinate; said disturbance forming and sustaining a partial split having circumferentially irregular shape at said trial position; said partial split being unsuited for storage transducing access;
    determining location of said partial split relative to said target coordinate by using a widened portion of said partial split as a relatively stable positional reference for distinguishing said relative location;
    when said trial position coincides with said target coordinate position varying the pressure of said ventilation fluid to form said auto-sustaining split at said target coordinate position; and
    when said trial and target positions do not coincide, shifting the position of said external disturbance incrementally until said trial and target positions do coincide and then excecuting said above-mentioned pressure varying step to form said auto-sustaining split.

2. In a mass storage disk file containing multiple flexible storage disks rotating coaxially in a spaced stack configuration, said stack being supplied with ventilation fluid internally which replenishes ambient fluid expelled from between said disks by centrifugal action, the pressure of said ventilation fluid being variable to condition surfaces of said disks alternatively to distinct first and second states of axial displacement equilibrium, said states serving respectively to inhibit and support formation of a circumferentially uniform auto-sustaining split suitable for storage transducing access at any preselected target axial coordinate position in said stack when said stack is transiently disturbed at said position in association with a variation in said pressure, the method of estabilishing a said circumferentially uniform split precisely and quickly at a said target position comprising:
    applying a disturbance externally at a selected (trial) axial position in said stack while said surfaces are in said first (inhibiting) state of displacement equilibrium; said trial position being either coincident with said target position or offset slightly therefrom due to variations in disk thickness and varying motion of edges of said disks tending to make determination of said target position inherently imprecise; said disturbance forming and sustaining a partial split at said trial position, said partial split having circumferentially irregular shape unsuited for storage transducing access but forming much more quickly than said auto-sustaining split;
    determining offset of said trial position relative to said target position by using a wide portion of said partial split as a relatively unvarying positional reference in said stack;
    depending upon whether said offset determining step respectively indicates coincidence (null offset) or non-coincidence between said trial and target positions selectively performing a respective one of the following steps:
        a. upon coincidence generating an indication of said coincidence;
        b. upon non-coincidence correctively shifting the position of said disturbance relative to said stack, in predetermined increments of displacement and in a direction suitable for reducing the offset, and repeating said steps of determining and selectively performing; and
    in response to said indication of coincidence, varying said ventilation fluid pressure to condition said surfaces to said second state of displacement equilibrium while sustaining said disturbance; thereby causing said auto-sustaining split to form at the target position.

3. The method of claim 2 including the step following said ventilation pressure varying step of:
    terminating said disturbance.

4. The method of claim 2 wherein said disturbance is produced by:
    directing a focused jet of said ambient fluid under pressure radially into said trial position.

5. The method of claim 4 wherein said jet is confined to a small arc section of the rotational ambit of said stack and said offset determining step is accomplished by:
    sensing progressively differentiated indicia on edges of disks passing to one side of and abutting said partial split.

6. The method of claim 2 wherein said predetermined increment of corrective shifting is less than the space between consecutive said disks in an unsplit and undisturbed configuration.

7. The method of claim 2 wherein said determining step is accomplished by sensing progressively differentiated indicia on edges of disks passing to one side of and abutting said partial split at said wide portion of said partial split.

8. The method of claim 7 wherein said sensing of indicia is carried out relative to indicia picked up diffusely from a group of plural adjacent said disks on said one side of said partial split.

9. The method of claim 7 wherein said indicia are pulse burst manifestations which are angularly staggered on successive said disks so as to be individually sensible without overlap and wherein bursts on successive disks contain different numbers of discrete pulse manifestations varied in a predetermined progression throughout said stack to provide said progressive differentiation.

10. In a mass storage flexible disk file containing multiple flexible storage disks rotating coaxially in a spaced stack configuration, said stack receiving ventilation fluid under varied pressure which replenishes ambient fluid expelled from between said disks by centrifugal action, and which also conditions displaceable storage surfaces of said disks alternatively to distinct first and second states of displacement equilibrium, said states serving respectively to inhibit and support formation of a circumferentially uniform auto-sustaining split suitable for storage transducing access at any selected target axial coordinate position of said stack when said stack is transiently disturbed at said position, apparatus for precisely and quickly verifying correct alignment of a source of said transient disturbance with said target position before forming said split comprising:
    means for positioning a said source of disturbance in alignment with a trial position estimated to coincide with said target position;
    means effective to jointly condition said ventilation fluid pressure to a condition associated with said first equilibrium state, and said source to a condition for sustainably disturbing said stack to produce a partial split at said trial position having circumferentially irregular form;
    means for detecting a relatively unvarying wide portion of said partial split;
    means coupled to said detecting means for determining the offset of said trial position relative to said target position; and
    means conditioned upon said determination of offset for alternatively effecting:
        a. generation of indication of position coincidence when said offset has null magnitude; and
        b. otherwise initiating coordinated further iterative operation (of said positioning means, said detecting means, said offset determining means and said alternative effecting means) to re-locate said partial split closer to said target position, in re-locational increments sufficiently small to avoid the possibility of overshooting the target position.

11. Apparatus in accordance with claim 10 including:
    means responsive to said coincidence indication for successively controlling said ventilation fluid pressure to produce said second equilibrium state and controlling said source to terminate said disturbance.

12. Apparatus in accordance with claim 10 wherein said source comprises means for controllably emitting a stream of said ambient fluid, confined both axially and circumferentially in alignment relative to said trial and relocational positions.

13. Apparatus in accordance with claim 10 wherein edges of successive said disks contain progressively differentiated indicia and said detecting means includes means for distinguishing the indicia on the edge of a disk facing a predetermined side of said partial split.

14. Apparatus in accordance with claim 13 wherein said distinguishing means comprises a sensing head configured to receive indicia from edges of plural said disks and means coupled to said head for logically processing said indicia to effect precise discrimination of the indicia contained on said facing disk.

15. Apparatus according to claim 14 wherein said indicia comprise pulse burst manifestations progressively staggered at different non-overlapping angle sectors of successive disks and arranged in progressively differentiatable configurations on successive disks.

16. Apparatus according to claim 15 wherein bursts on successive said disks have different numbers of pulses, the numbers differing in a predetermined numerical progression.

* * * * *